United States Patent [19]
Smith

[11] Patent Number: 5,687,977
[45] Date of Patent: Nov. 18, 1997

[54] STEERABLE TOBOGGAN

[76] Inventor: Bruce Cameron Smith, 26 Rowley Avenue, Toronto, Ontario, Canada, M4P 2S8

[21] Appl. No.: 597,465

[22] Filed: Feb. 2, 1996

[51] Int. Cl.$^6$ .................................................. B62B 13/02
[52] U.S. Cl. ........................... 280/18; 280/16; 280/22; D12/6
[58] Field of Search .......................... 280/16, 18, 21.1, 280/22, 28.11, 26, 606; D12/6, 11

[56] References Cited

U.S. PATENT DOCUMENTS

| | | | |
|---|---|---|---|
| 2,829,902 | 4/1958 | Stocker | 280/18 |
| 3,169,779 | 2/1965 | Haab | 280/18 |
| 3,522,952 | 8/1970 | Uttenthaler . | |
| 3,628,804 | 12/1971 | Carreiro . | |
| 4,320,905 | 3/1982 | Andrew . | |
| 4,678,445 | 7/1987 | Monreal . | |
| 5,348,322 | 9/1994 | Rauf et al. . | |
| 5,509,665 | 4/1996 | Hansen | 280/22.1 |

OTHER PUBLICATIONS

Laserluge Product Brochure (circa 1995).

*Primary Examiner*—Brian L. Johnson
*Assistant Examiner*—Avraham Lerner
*Attorney, Agent, or Firm*—Riches, McKenzie & Herbert

[57] ABSTRACT

A steerable toboggan for sledding on snow is disclosed which includes a support having a bottom gliding surface which slides directly on the snow, and a pair of runner arms carrying guide ribs which extend forwardly beyond the gliding surface. Each of the guide ribs includes a curved portion which is vertically movable relative to the other between a raised position, with the curved portion raised above the snow, and a lowered position where the curved portion of the guide rib is brought against the snow. The toboggan is steered by selectively lowering the curved portion of one of the guide ribs onto the snow as the toboggan moves. The bulk of the user's weight is supported by the underlying snow, enabling the support to be formed from thinner less expensive materials, without requiring complex manufacturing processes.

20 Claims, 4 Drawing Sheets

STEERABLE TOBOGGAN

SCOPE OF THE INVENTION

This invention relates to an apparatus for sledding or tobogganing on snow and, more particularly, to a toboggan having two guide ribs which each have a curved forward end which may be selectively raised or lowered on to the snow to control the direction of toboggan movement.

BACKGROUND OF THE INVENTION

Apparatus for sledding on snow, such as sleighs, toboggans and luge are well known. Conventional toboggans are formed from flat thin boards which are curved upwardly at their front end to ride over loose snow. Conventional sleighs include a pair of fixedly spaced runners or rails. A difficulty with conventional toboggans and snow sleds resides in that they are difficult to manoeuvre or steer, with the result that in use, they typically travel in linear movement thereby making them unsuitable for use on winding trails and the like.

Snow luge apparatus provide a user with greater control and the ability to steer by suspending the user above the snow on a bridge which is supported by two narrow movable curved runners. Conventional luge suffer the disadvantage of requiring sufficient structural integrity to maintain the rider suspended above the snow. Thus, conventional superior quality luges have their bridges supported by complex frame structures as with separate joints and metal runners. In one attempt to avoid the need for a complex frame structure, U.S. Pat. No. 5,348,322 to Rauf et al, which issued Sep. 20, 1994, discloses a largely plastic luge. However, the luge taught by Rauf continues to require a relatively expensive structure to support the user on a bridge above the snow, particularly as compared to the expense of conventional toboggans.

A further disadvantage with conventional snow luge exists in that the user's weight is entirely supported on the snow by the two narrow runners. The increased pressure on the runners makes the luge less likely to float on loosely packed snow. As well, the glide surface of the runners are more susceptible to nicks and scrapes.

SUMMARY OF THE INVENTION

To at least partially overcome the disadvantages of the prior art, the present invention is directed to an apparatus for sledding or tobogganing on snow, and which incorporates the substantial weight supporting glide surfaces of a toboggan, together with a pair of forwardly extending guide ribs having curved portions which may be individually selectively brought against the snow to turn the apparatus.

Another object of the present invention is to provide a steerable toboggan for sledding on snow which is both economical and easy to produce.

Another object of the invention is to provide a sledding apparatus which incorporates a comparatively large gliding surface so as to spread out a user's weight thereon, to permit the apparatus to slide across uncompacted snow with minimal sinking, and/or to reduce the formation of nicks and scrapes in the glide surface.

Another object of the invention is to provide a sledding apparatus which may be manufactured as an integral unit as from plastic by moulding or forming processes.

A further object of the invention is to provide a light weight sledding device having the steerability associated with snow luge runners while possessing the simplified construction of a toboggan.

The present invention provides a steerable toboggan for tobogganing or sledding on snow which includes a support surface for supporting a user thereon as in a sitting, or preferably reclining position and which has a bottom gliding surface which slides directly on the snow. A pair of runner arms extend forwardly beyond the gliding surface. Guide ribs extend along the bottom of the toboggan and forwardly under each runner arm where each of the guide ribs includes a curved section. The runner arms are vertically movable relative to each other between a normal, unbiased raised position, wherein the curved section of the guide rib is substantially moved out of contact with the snow, and lowered positions where the curved section of the guide rib is brought against the snow. In this manner, by lowering either runner arm and thus its curved section of one guide rib onto the snow as the toboggan is moved, the engagement of the snow with the curved section of the guide rib is used to change the direction along which the toboggan travels. The bulk of the user's weight is supported not by the guide ribs, but by the bottom gliding surface which lies directly on the underlying snow. As such, the toboggan may be formed inexpensively of thinner, less expensive materials, without the manufacturing difficulties associated with steerable prior art devices.

In one simplified embodiment, each guide rib has a forward curved section which curves upwardly and in an inward direction towards the other guide rib, and which may be selectively lowered by the user into engagement with the snow. The guide ribs are movable between a position with the respective curved sections raised above the snow, so as not to affect the direction of movement of the toboggan, and a lowered snow engaging position. Preferably, the runner arms and therefore the guide ribs are resilient and have an inherent resilient bias to return to the normal, unbiased raised position and are movable therefrom to lowered positions by the user applying downward pressure on the ends of the runner arms, as for example, with his or her legs and/or feet.

For stability, each guide rib extends rearwardly from the forward curved section into a rearward portion. More preferably, the guide ribs extend along each side of the support and project downwardly below the gliding surface a distance which is sufficient to engage the snow to assist in guiding the toboggan as it moves, yet not so far as to substantially interfere with the sliding contact of the gliding surface along the snow.

The front end of the toboggan may be provided with a snow deflecting lead surface which assists in guiding the toboggan over the snow, and prevents the forward end of the apparatus from tunnelling into loose snow. The lead surface preferably curves forwardly and upwardly in front of the gliding surface, and extends forwardly along an inner edge of the runner arms to also guide the runner arms on top of the snow as the toboggan moves. Exterior sidewall panels may also be provided to assist in maintaining the rider in position on the support and deflect snow away from the rider.

Accordingly, in one aspect, the present invention resides in a steerable toboggan comprising, a rear portion having a planar snow engaging bottom gliding surface extending substantially across the entire width of the rear portion, the rear portion merging forwardly into two mirror image side-by-side forwardly tapering runner arm members having bottom surfaces which curve upwardly from the gliding surface towards a respective front end tip, the bottom surface of each runner arm member having a continuous guide rib therealong at a lowermost point along the length of each runner arm member, each said guide rib including a forward curved portion curving upwardly and inwardly towards the opposing one of the runner arm members as the guide rib extends towards its respective first end tip, the runner arm members being vertically movable relative to the rear portion and to each other to steer the toboggan by selectively moving at least part of one of the forward curved portions of the guide ribs against the snow.

In another aspect, the present invention resides in a steerable sledding apparatus for sledding on snow comprising, seating means for supporting a user's buttocks thereon, the seating means having a generally flat bottom gliding surface for slidably engaging and transmitting said user's weight to said snow, a leading surface curving forwardly and upwardly from the seating means to assist in guiding the gliding surface on top of the snow, first and second spaced guide rib means for adjusting directional movement of the apparatus, each of first and second guide rib means extending forwardly beyond the seating means and having a forward curved portion which curves away from the gliding surface upwardly and in an inward direction towards the opposing one of the first and second guide rib means, the forward curved portion of each of the first and second guide rib means being vertically movable relative to the other of the guide rib means between a raised position wherein said forward portion is spaced above the snow and a lowered position wherein the forward curved portion is brought into engagement with the snow.

In a further aspect, the present invention resides in a steerable apparatus for sledding on snow comprising, spaced apart first and second guide rib means for adjusting directional movement of the apparatus, each of the first and second guide rib means having a forward portion and a rearward portion, support means for supporting a user in a seated or reclined position thereon, the support means located between the rearward portions of said first and second guide rib means and including a generally flat snow engaging bottom gliding surface to transmit load forces to said snow between said first and second guide rib means, the support means having a front end and a rear end, snow deflecting lead surface means curving upwardly away from the front end to assist in directing said gliding surface on top of said snow, the rearward portion of each of said guide rib means projecting downwardly past said gliding surface a distance selected so as not to substantially interfere with the sliding of said gliding surface on said snow, the forward portion of each of said first and second guide rib means extending forwardly beyond the front end, and including a forward curved portion curving away from the gliding surface upwardly and in an inward direction towards the other one of said guide rib means, the forward curved portion of each of the first and second guide rib means being resiliently movable relative to the other from an unbiased raised position substantially spaced above said snow, to a biased lowered position wherein the forward curved portion is moved into engagement with said snow.

BRIEF DESCRIPTION OF THE DRAWINGS

Further objects and advantages of the invention will appear from the following description taken together with the accompanying drawings in which.

DETAILED DESCRIPTION OF THE INVENTION

Reference is now made to FIGS. 1 to 8 which show a toboggan 10 in accordance with a first preferred embodiment. The toboggan is symmetrical about a longitudinal central plane indicated as 1-1' in FIG. 2 and extending in a plane normal to the plane of FIG. 2. In this disclosure, similar reference numerals are indicated to refer to elements which appear symmetrically and are duplicated on either side of the longitudinal center line, and with the right side designated as "r" and comprising the lower side in FIG. 2 and the left side designated as "l" and comprising the upper side in FIG. 2.

Figure 2:
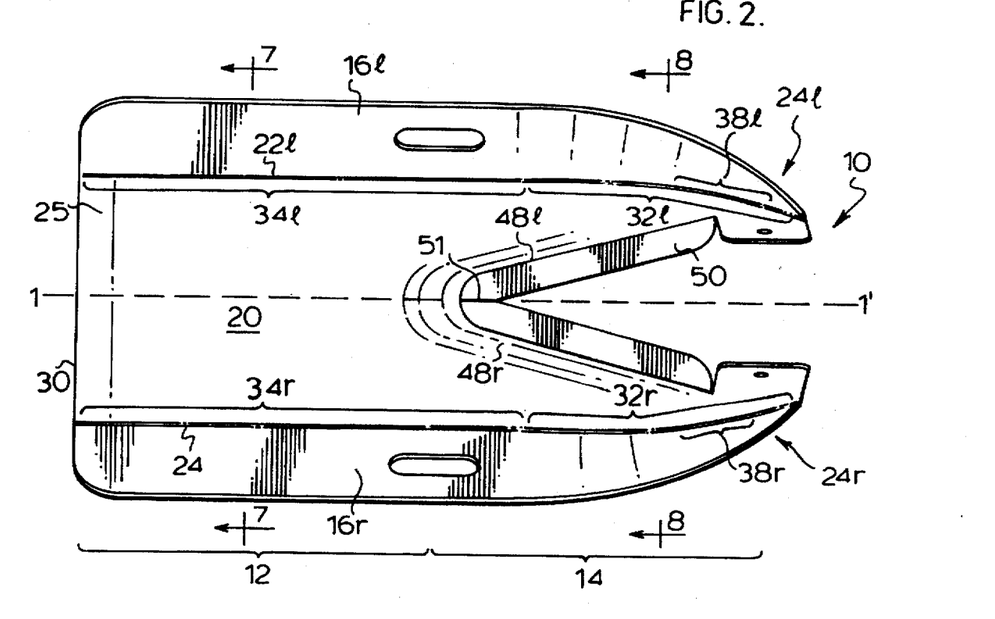
FIG. 2 is a perspective top view of the toboggan of FIG. 1.
Figure 3:
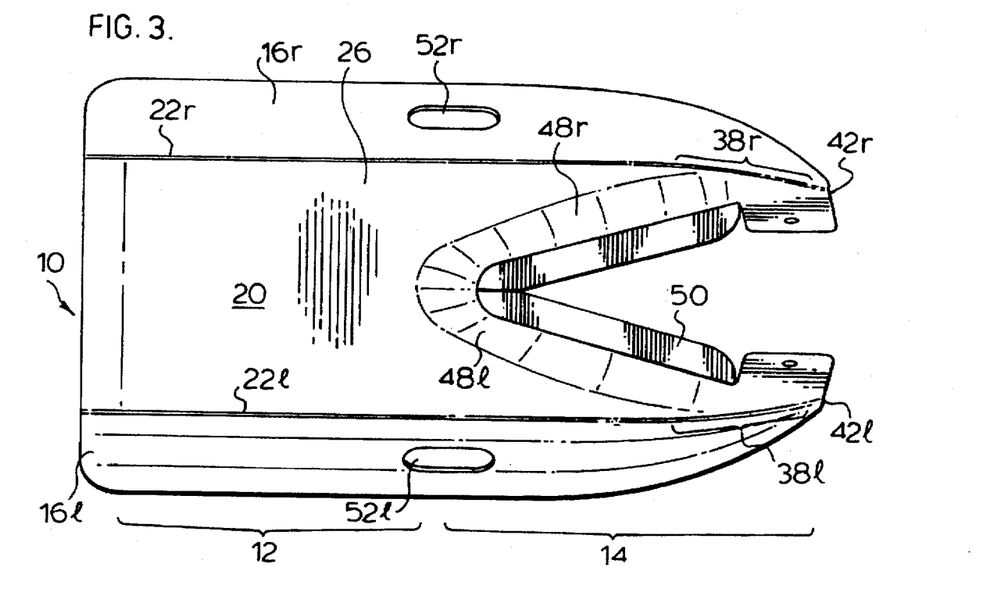
FIG. 3 is a bottom view of the toboggan of FIG. 1.

The toboggan 10 as seen in FIGS. 2 and 3 has a rear seating portion 12 which is integrally formed with and merges into a bifurcated front steering portion 14. The front steering portion 14 includes left and right steering runner arms 24l,24r provided in a mirror image side-by-side orientation. A pair of spaced guide ribs 22l,22r extend the entire length of the toboggan 10 from the back of the rear portion 12 and forwardly with each guide rib extending along the length of an associated runner arm to the front.

Figure 7:
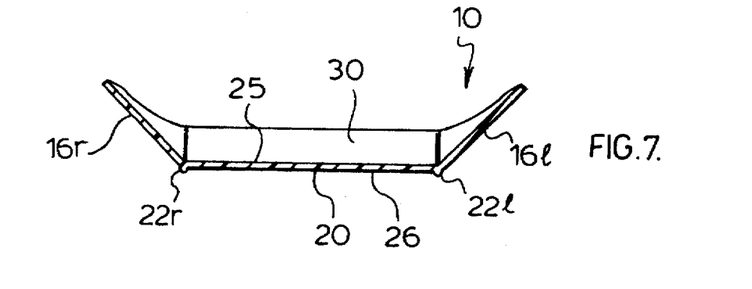
FIG. 7 is a cross-sectional rearward view of the toboggan shown in FIG. 2 taken along line 7-7'.

FIGS. 2 and 7 show the rear portion 12 as including a bottom panel 20 having a flat upper surface 25 on which a user rests, and a smooth flat gliding surface 26 which contacts and slides along the snow as the toboggan 10 moves. The panel 20 and gliding surface 26 merge at their forward end into the steering portion 14, and at their rearward end, into an upturned rear end 30. The bottom panel 20 spans between the guide ribs 22l,22r and has a width, preferably of about 0.5 meters and a length along its centre preferably of at least about 1.0 meters so as to be sufficient to comfortably support the user preferably sitting, or reclining with the user's buttocks on the upper surface 25 and the user's legs extending forwardly with one leg overlying each runner arm. The bottom panel serves to distribute the weight of the user thereon substantially over the entire gliding surface 26. It is to be appreciated that a longer panel may be provided if the toboggan 10 is to be modified for use by more than one rider. The thickness of the panel 20 is selected having regard to the material used to manufacture the toboggan 10 so that the panel 20 is preferably flexible or semi-flexible, allowing the panel 20 to bend or twist about its middle, while distributing the weight of the user thereon substantially evenly over the entire gliding surface 26.

With the apparatus 10 the weight of the user is effectively transferred from the upper surface 25 through the panel 20 and directly to the underlying snow, the need to support the panel 20 by structural frames or the like is eliminated. The gliding surface 26 is similar to that of conventional toboggans, so that the user's weight is widely distributed, and amongst other things making the toboggan 10 less likely to sink in loosely packed snow.

Figure 1:
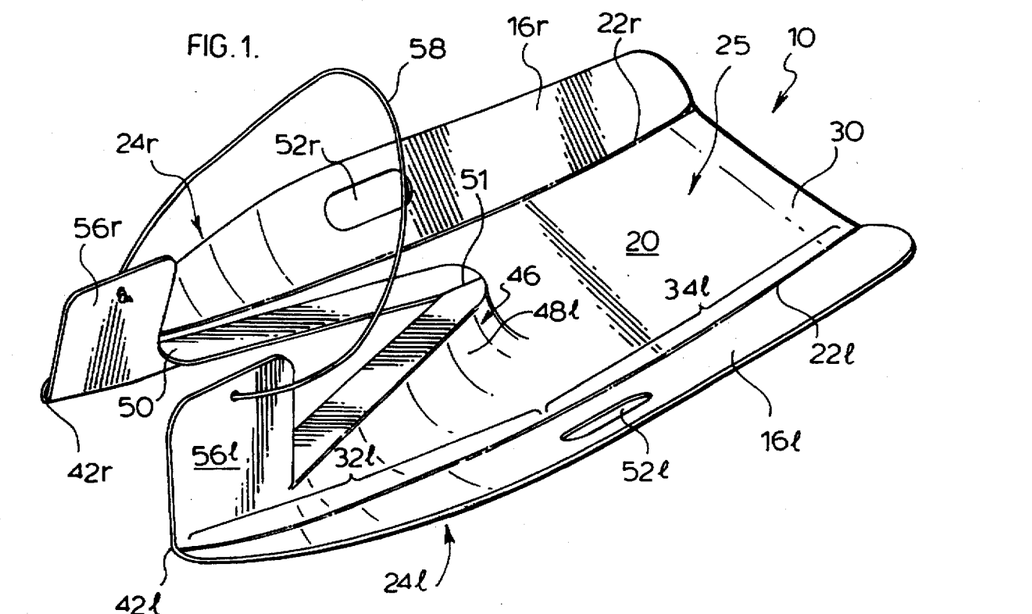
FIG. 1 is a perspective view of a steerable toboggan in accordance with a preferred embodiment of the invention.
Figures 4, 5:
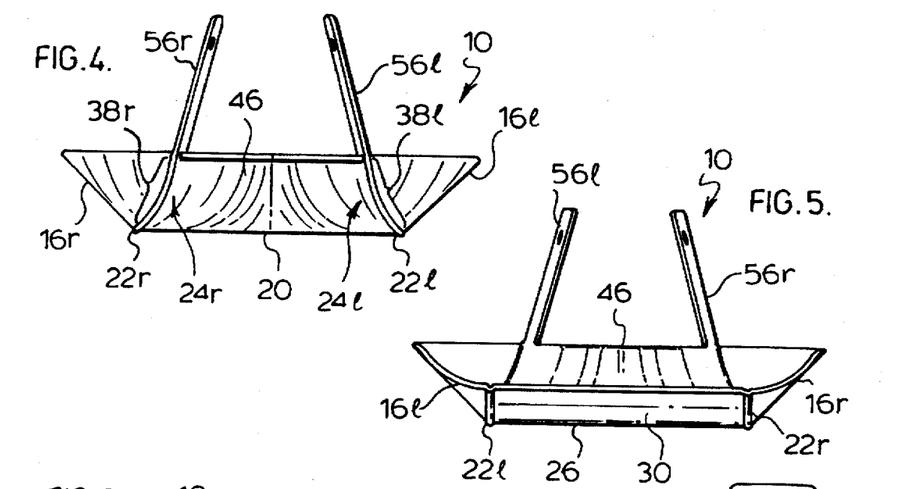
FIG. 4 is a perspective front view of the toboggan of FIG. 1.
FIG. 5 is a perspective rear view of the toboggan of FIG. 1.
Figure 8:
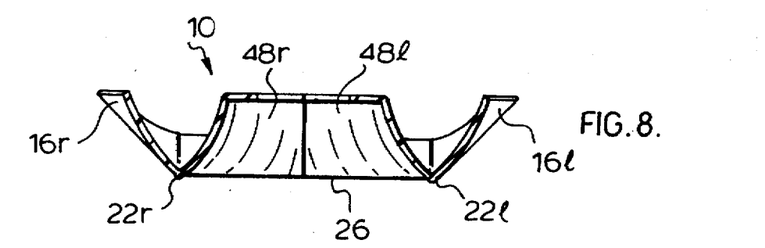
FIG. 8 is a cross-sectional rearward view of the toboggan shown in FIG. 2 taken along line 8-8'.

A pair of opposing exterior sidewalls 161,16r are provided along the sides of the toboggan 10. As best seen in FIGS. 1, 4 and 8, the runner arms have an overall tapering boat-hull like shape as formed by a respective laterally exterior sidewall 161 or 16r and a respective laterally interior sidewall 481 or 48r with a respective guide rib 221 or 22r extending along the bottom of each runner arm as the lowermost point of the runner arm at each point along each runner arm's length.

FIGS. 2 to 6 show best the guide ribs 221,22r as consisting of a pair of spaced elongated ribs which extend downwardly and preferably run the entire length of the toboggan 10. The guide ribs 221,22r are preferably formed to have a width of between about 1.5 to 0.5 cm and to project downwardly from the adjacent underside of the toboggan 10 a distance of between about 1.5 and 0.5 cm.

The guide ribs 221,22r each include forward rib portions 321,32r, and rearward rib portions 341,34r. As seen best in FIGS. 2, 3 and 7, the rearward portions 341,34r of the guide ribs 221,22r extend substantially parallel to each other along each side edge of the bottom panel 20. The rearward rib portions 341,34r project downwardly a distance below the gliding surface 26, so as not to substantially interfere with the contact of the gliding surface 26 on the snow, while providing sufficient engagement with the snow to prevent sideways sliding of the toboggan 10. In this manner, the majority of the user's weight is not supported by the guide ribs 221,22r, but rather is transmitted by the bottom panel 20 directly to the underlying snow.

Figure 6:
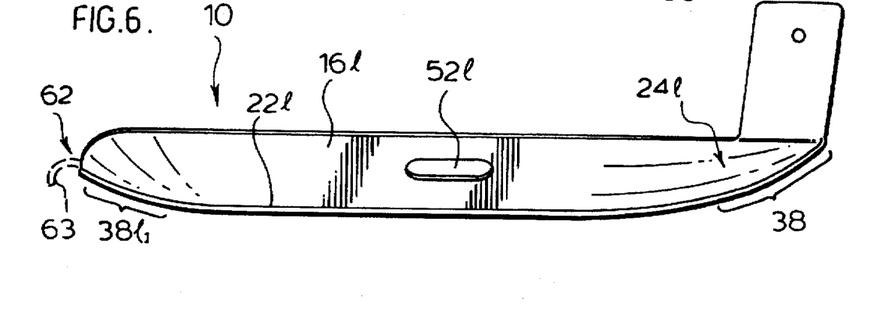
FIG. 6 is a side view of the toboggan of FIG. 1.

FIGS. 3, 4 and 6 best show that the forward rib portions 321,32r of the guide ribs 221,22r extend forwardly beyond the gliding surface 26 and along the respective runner arms 241,24r of the steering portion. The forward rib portions of the guide ribs each have a forwardmost curved section indicated as 381,38r with each end at a respective forwardmost tip 421,42r. Each of the curved sections 381,38r curves away from the rear portion 12 both upwardly above the plane of the gliding surface 26 and inwardly towards longitudinal central plane.

As seen in plan view in FIG. 2, the curved sections 381,38r start tangent to rearward linear sections of the forward rib portions and each curve laterally inwardly towards the longitudinal central plane 1–1' and thus towards the opposing spaced guide rib. The radius of lateral inward curvature of the curved sections 381,38r decreases towards their respective tips 421,42r. The curvature of the curved sections 381,38r is preferably selected so that tips 421,42r are separated by a distance which is approximately 80% of the distance between the parallel rearward portions 341,34r of the ribs 221,22r.

As seen in side elevation view in FIG. 6, the curved section 381 starts tangent to rearward linear section of the forward rib portion and curves upwardly towards the front tip 421.

To permit steering of the toboggan 10, each steering arm 241,24r is movable relative to each other from an unbiased raised position shown in FIGS. 1 to 8, wherein their respective curved sections 381,38r of the guide ribs are maintained in an orientation spaced substantially above the surface of the snow, and lowered positions wherein their respective curved sections 381,38r of the guide ribs are progressively lowered into the snow with more and more of the curved sections of the respective guide rib engaging the snow. The toboggan 10 is formed so that the steering arms 241,24r are resilient for deflection downwardly and upwardly from an unbiased raised position and have an inherent bias to return to the unbiased raised position in which they are spaced above the snow. The guide ribs may be selectively moved from the unbiased raised position to the lowered positions as by the user applying downward pressure on the respective runner arms with his or her legs and/or feet.

More particularly, in the preferred embodiment, downward pressure on one of the steering arms 241,24r causes the support 20 to flex about its middle, and thereby allows for each of steering arms 241,24r to move relative to the other steering arm, lowering one of the respective steering arms 241,24r and thus the curved section 381,38r of the guide rib carried thereon at least partially into the snow. The steering arms preferably may also be resiliently flexible laterally for movement laterally inwardly by pressure from the user's legs or feet, to move the tips 421,42r closer together and selectively provide one of the curved sections 381,38r with a relatively smaller radius of curvature to achieve tighter turns.

FIGS. 1 to 4 show the steering portion 14 as further including a snow deflecting leading surface 46. The leading surface 46 of the toboggan 10 curves upwardly from a front end of the gliding surface 26. In the embodiment shown in FIG. 1, the leading surface 46 is comprised of a pair of interior sidewalls 481,48r, which are oriented at an oblique angle to the direction of toboggan movement and which angle inwardly rearward from a respective end tip 421,42r in a forwardly open V-shape to provide the steering portion 14 with its overall bifurcated shape. Each interior sidewall 481,48r curves forwardly from the centre of the toboggan 10 where the sidewalls 481,48r merge into each other, and along an inner edge of the runner arms 241,24r. FIG. 1 and 2 show best the leading surface 46 as curving convexly upwardly from the gliding surface 26, into a generally horizontal inwardly extending web 50 which is split at a cut line 51 centered where the sidewalls 481,48r merge. The upward curvature of the leading surface 46 advantageously acts to guide the toboggan 10 on top of loosely packed snow, preventing the runner arms 241,24r and bottom panel 20 from tunnelling into the snow as the toboggan 10 moves. The upward extent of the leading surface 46 and the web 50 further advantageously act to deflect snow and spray down under the toboggan and thus away from the user.

As indicated previously, the exterior sidewalls 161,16r are provided extending along the entire length of the toboggan 10 from the end tips 421,42r to the rear end 30. Each exterior sidewall 161,16r projects upwardly and angles outwardly from a respective guide rib 221,22r. In addition to keeping snow off of the user and assisting in guiding the toboggan 10 on top of the snow, the sidewalls 161,16r facilitate steering of the toboggan 10 by providing surfaces against which a user may laterally direct his or her weight to assist in urging part of a curved sections 381,38r to the lowered positions. A pair of handles 521,52r provided as openings through each sidewall 161,16r enable the user to better maintain a desired position on the toboggan 10 and facilitate weight transfer to bias part of the runner arms downwardly to effect turning.

The exterior sidewalls 161,16r and interior sidewalls 481,48r are of a construction to permit vertical movement of the runner arms 241,24r relative to the rear portion 12, enabling the associated forward curved sections 381,38r of the guide ribs to be moved into engagement with the snow.

Each runner arm 241,24r includes a pair of enlarged flanges 561,56r, extending upwardly and angling slightly inwardly from a portion of each interior sidewall 481,48r adjacent the tips 421,42r respectively. The flanges 561,56r provide engagement surfaces against which the user may direct his or her leg, ankle or foot to provide downward and/or inward pressure to deflect the runner arms and thereby urge the respective curved ends 381,38r into contact against the snow. FIG. 1 shows a rope 58 tied at each of its ends to one of the flanges 561,56r by the rope passing through a hole in each flange sized to be smaller than a knot on the end of the rope. The rope 58 has been omitted from FIGS. 2 to 8 for clarity.

In use of the toboggan 10, a user sits or reclines on the upper surface 25 of the bottom panel 20 with his buttocks on the upper surface 25 and with each of his or her legs forwardly over each runner arm 241,24r and into engagement with the flanges 561,56b. Preferably, an adult would have the inside of the adult's ankles engage the laterally outside surfaces of the flanges 561,56r. In this position, the user's legs are partially cradled in an upwardly open "V" formed in each runner arm 241,24r by each of the inward curving interior sidewall 481,48r, and the forward parts of the outward angling exterior sidewalls 161,16r.

With the user grasping either of the handles 521,52r or less preferably the rope 58, the toboggan 10 is steered as it moves along the snow by applying selective downward and inward pressure on one of the runner arms with the user's legs.

To turn the toboggan 10 right, the user's left leg is lowered against the left runner arm 241 to move more and more of the left curved section 381 downwardly against the snow. As more of the left curved section 381 of the left guide rib 221 is brought against the snow, its curved shape which curves inwardly to the right causes the front end of the toboggan 10 to turn to the right along the direction of curvature. The increasing radial curvature of the curved section 381 enables control over the degree of turning. Tighter turns are achieved by biasing the curved section 381 fully downward to bring the most tightly curved portion of the guide rib 221 adjacent the tip 421 against the snow. Broader turns are achieved by moving the curved section 381 only partially against the snow. When a user applies downward pressure on the left guide rib 221 with his leg, the user may also apply laterally inward pressures against the left flange 561 to move the left curved section 381 of the left guide rib 221 further inwardly, and achieve tighter steering as in effect by bending the left runner arm 241 inwardly to the right and decreasing the radius of the left curved section 381 of the left guide rib 221. Simultaneously, with the user applying downward pressure on the left runner arm 241, the user may also apply upward pressures on the right flange 56r to raise the right runner arm 42r and thus the forward portion of the right guide rib 321. This may be accomplished by the user hooking the heel of right foot about the right flange 541 and drawing it upwardly and to the rear, and/or by the user pulling upwardly on the right hand side of rope 58 to draw the right flange 56r upwardly and to the rear.

Once the toboggan 10 is turned to the desired orientation, the user releases the pressures applied to the guide ribs 221 and 22r and the runner arms 241 and 24r and runner arms and their guide ribs resiliently return the curved sections 381,38r to the unbiased position off of the snow. As the curved end 381 returns to the raised position, only the rearward rib portions 321,34r remain in contact with the snow, guiding the toboggan 10 in straight movement.

Left-hand turns on the toboggan 10 are achieved in the identical manner by the user lowering his or her right leg downwardly against the right runner arm 24r to lower right curved section 38r onto the snow.

FIGS. 7 and 8 show best the sidewalls 161,16r as angling upwardly and outward away from the bottom panel 20, however, if desired, the sidewalls 161,16r could equally be provided in a perpendicular or inwardly angled orientation relative to the bottom panel 20.

Figure 9:
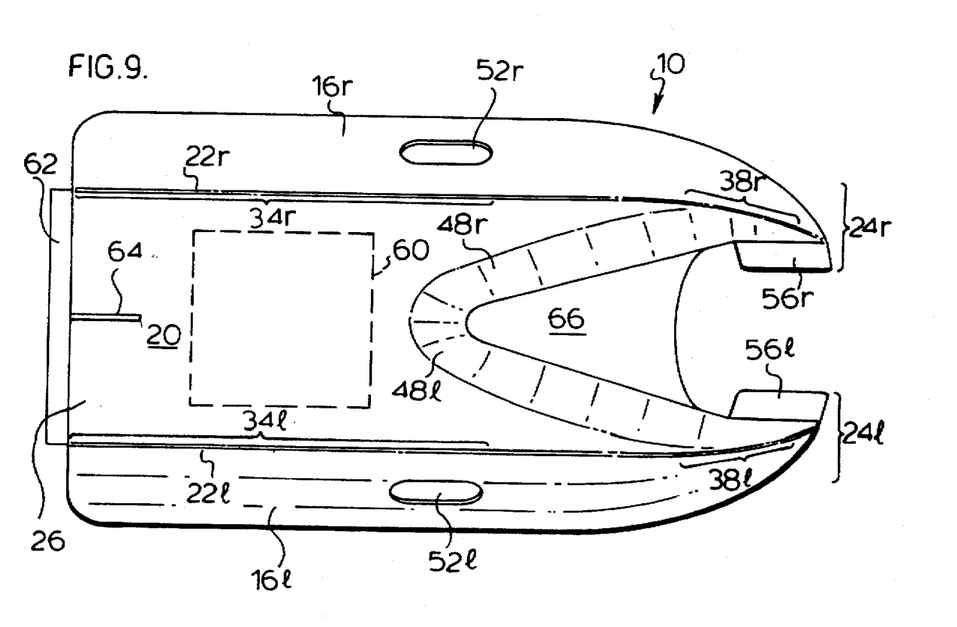
FIG. 9 is a schematic bottom view of a toboggan in accordance with a second embodiment of the invention.

FIG. 9 shows a second version of the toboggan in accordance with the present invention and wherein like reference numerals are used to identify like components. The toboggan 10 of FIG. 9 includes runner arms 241,24r and guide ribs 221,22r which are essentially identical to those described with reference to FIGS. 1 to 8, with the exception that the rearward rib portions 321,32r are not precisely parallel but tapered slightly inwardly towards the rear end 30. The rear portions 321,32r need not be straight or parallel and may vary from being parallel or straight to minor extents.

The bottom panel 20 of the toboggan shown in FIG. 9 is similar to that shown in FIG. 6. Dotted line 60 shows a proposed location of attachment of a seat member, as for example to comprise a thin sheet of cushioning foamed plastic material affixed as by gluing to the upper surface 25 of the panel 20 to provide enhanced comfort to the buttocks and/or lower back of a user in a seated or reclining position. The gliding surface 26 is shown provided with one downwardly projecting auxiliary rear guide rib 64 to provide enhanced control of the toboggan 10 and further reduce lateral sliding of the rear portion 12 of the toboggan 10 when turned. Other parallel auxiliary guide ribs 64 may be provided, provided the combined effect of auxiliary ribs does not prevent the toboggan from turning.

A braking scoop 62 extends rearwardly beyond the rear end 30 to provide a mechanism by which the toboggan 10 may be stopped. The scoop is shown schematically in dotted lines in side view in FIG. 6 as extending rearwardly and downwardly to present a downwardly directed stopping edge 63 preferably about 3 cm above the plane of gliding surface 26. In use of the braking scoop 62, the user extends his or her feet outwardly over each of the sidewalls 16,18 and lifts the steering portion 14 of the toboggan 10 to bring the stopping edge of the braking scoop 62 to bear against the snow.

In the embodiment of FIG. 9, a cover 66 is provided across the open V formed by the merging interior sidewalls 481,48r in place of the web 50, to provide enhanced snow deflection and reduce snow spraying the user. The cover 66 may be removably held in place by snaps (not shown) or the like, and is preferably formed from a flexible material, such as thin plastic, nylon or canvass, so as not to interfere with the vertical movement of the runner arms 241,24r or forward curved sections 381,38r of the guide ribs 221,22r.

While FIG. 9 shows a snow scoop 62 provided along the rear edge of the toboggan 10 as one preferred braking mechanism, other snow brake mechanisms such as lift hand brakes and the like are also possible.

The toboggan 10 illustrated in the first and second embodiments may be manufactured from many different materials including plastic, fibreglass, metal and wood.

Preferably, the toboggan would be made from plastic such as polyethylene as by thermoforming, blow molding, or injection molding. When made from plastic, the bottom panel 20 has a thickness of preferably between 3.0 and 0.1 cm and more preferably between 1.0 cm and 0.5 cm.

The tobogans 10 as shown in FIGS. 1 to 9 are preferably formed by molding as a single plastic sheet having a thickness of between about 0.5 to 1.0 cm. The thickness of the plastic sheet is selected so that the sidewalls 16l,16r and leading surface 46 do not substantially interfere with the vertical and/or inward movement of the runner arms. It has been appreciated that the flat open structure of the toboggan 10 advantageously lends itself to manufacture by simplified press, or alternately injection molding methods, with the leading surface 46, exterior sidewalls 16,18, bottom panel 20 and guide ribs 22,24 all being integrally formed. The overall open shape of the toboggan 10 further permits a number of toboggans to be vertically stacked for storage and/or shipping, achieving a further cost savings over bulkier conventional toboggans and luge.

Figure 10:
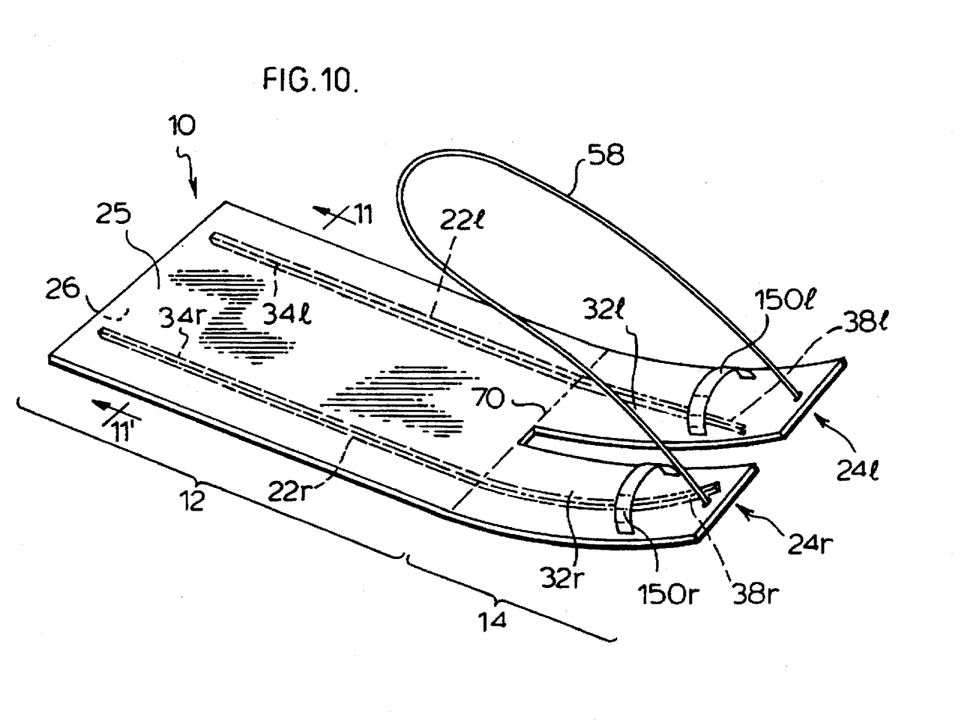
FIG. 10 is a schematic view of a toboggan in accordance with a third embodiment of the invention.
Figure 11:
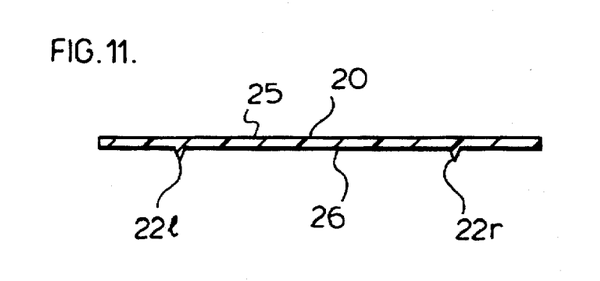
FIG. 11 is a cross-sectional view of the toboggan of FIG. 10 along line 11-11'.

FIGS. 10 and 11 show a simplified toboggan 10 in accordance with a third embodiment of the invention and in which like reference numerals refer to like elements. The toboggan 10 is preferably formed from a single sheet of plastic or other material such as metal, fibreglass or plywood. The toboggan includes a rear seating portion 12 on which a user sits or reclines, and which merges into an upturned bifurcated front steering portion 14 which is split along the longitudinal centre of the toboggan 10 into right and left upturned ski-like runner arms 24l,24r. Each of the upturned runner arms of the forward portion 14 is movable downwardly relative to the rear portion 12.

The rear portion 12 is provided with a support surface 20 having a flat upper surface 25 on which a user sits and/or reclines, and a flat lower gliding surface 26 which slides upon the snow.

A pair of spaced guide ribs 22l,22r are provided along the underside of the toboggan 10, extending rearwardly from a respective curved forward section 38l,38r which projects downwardly from the underside of each of the runner arms 24l,24r of the forward portion 16, into parallel rearward portions 32l,32r projecting downwardly along the sides of the gliding surface 26. As in the embodiments shown FIGS. 1 to 9, the guide ribs project downwardly from the underside of the toboggan 10 a sufficient distance to guide the toboggan 10 along the snow, but not so far as to substantially interfere with sliding of the gliding surface 26 therealong.

The forward portions 32l,32r of the guide ribs each include a respective curved sections 38l,38r which curve inwardly and upwardly away from the gliding surface 120 in similar arrangement as in FIG. 3. In essentially the same manner as the embodiments shown in FIGS. 1 to 9, the toboggan 10 is turned by moving one of the right or left runner arms 24l,24r to selectively raise and lower successive portions of the associated curved sections 38l,38r against the snow.

The toboggan 10 is preferably formed so that the upturned runner arms resiliently return to a position with their respective curved portions 38l,38r raised above the snow however it is not necessary that the runner arms be resilient and the relative vertical position of the runner arms could be controlled by the user. Foot straps 150l,150r are shown provided on each respective runner arm as one mechanism to assist a user in moving the runner arms vertically. A pull rope 58 is also connected to the runner arms as shown. The foot straps are not necessary. A user could merely place his foot adjacent the juncture of the rope 58 and the runner arm to assist in applying pressure downwardly. Some mechanism is advantageous for assisting in a user's foot or leg engaging and applying pressure to the runner arms.

One simplified construction for the toboggan of FIG. 10 is with the rear portion 12 of laminated plywood which is substantially rigid and inflexible, and with the upwardly curved runner arms 24l,24r being laminated plywood which is flexible to permit the runner arms to be flattened into the snow by selective application of downward pressures by a user. Alternatively, the runner arms could be configured to pivot relative the rear portion 12 as about a pivot axis indicated as dotted line 70 in FIG. 10. Of course, a plywood rear portion 12 could also be configured to be flexible.

The guide ribs 22l,22r in a toboggan of FIG. 10 configured from plywood, fibreglass or metal could comprise separate elongate strips of material such as wood, nylon, Teflon, plastic or metal secured as by screws, rivets and glue to the remainder of the toboggan.

The use of a flexible or semi-flexible bottom panel 20 is believed to be advantageous in that by flexing, twisting or bending the panel 20, vertical movement of the runner arms 24l,24r may be achieved without the need for a significant bending of the exterior sidewalls 16l,16r and leading surface 46, and increasing the overall structural integrity of the toboggan 10. The invention is not, however, so limited and the toboggan 10 could equally be provided with a rigid base and runner arms or guide ribs which bend or pivot along their length to provide the relative vertical movement of the curved end portions.

Although a flat gliding surface 26 is disclosed as being preferred, it is to be appreciated that the surface 26 could also be provided with a contoured profile and/or guide ribs or flights. Similarly, while a flat open structure of the toboggan 10 facilitates stacking, portions of the toboggan 10 could have thicker portions of different dimensions to provide the toboggan 10 with a more streamlined or aesthetically striking visual appearance.

The preferred embodiments of the invention illustrate the bottom panel 20, leading surface 46, guide ribs 22l,22r and sidewalls 16l,16r as all being formed from a flat planar sheet of plastic. It is to be appreciated, however, that one or more of these components could be formed separately and then assembled together without departing from the scope of the present invention.

While the detailed description describes and illustrates a toboggan to be used on snow, the invention is not so limited. With minor modification, the present invention could equally be adapted as a sledding apparatus for use on water, as for example, as a water sled to be pulled behind a power boat with a user sitting, kneeling or standing thereon. A modified version of the apparatus for use on water may for example be formed of a suitable buoyant material such as that used in surf boards to provide floatation.

Although the disclosure describes and illustrates preferred embodiments of the invention, it is not limited to these particular embodiments. Many variations and modifications will now occur to those skilled in the art. For a definition of the invention, reference is made to the appended claims.

We claim:

1. A steerable toboggan comprising,
    a rear portion having a planar snow engaging bottom gliding surface extending substantially across the entire width of the rear portion,
    the rear portion merging forwardly into two mirror image side-by-side forwardly tapering runner arm members having bottom surfaces which curve upwardly from the gliding surface towards a respective front end tip, the bottom surface of each runner arm member having a continuous guide rib therealong at a lowermost point along the length of each runner arm member, each said guide rib including a forward curved portion curving upwardly and inwardly towards the opposing one of the runner arm members as the guide rib extends towards the respective end tip, the runner arm members being vertically movable relative to the rear portion and to each other to steer the toboggan by selectively moving at least part of the forward curved portions of the guide ribs against the snow.

2. A toboggan as claimed in claim 1 wherein each of said runner arm members includes an inward facing interior sidewall curving upwardly from the respective bottom surface, the interior sidewalls merging into each other rearwardly from the respective end tips.

3. A toboggan as claimed in claim 2 wherein the runner arm members are biased to resiliently return to a raised position wherein the respective curved forward portions of the guide ribs are substantially moved out of engagement with the snow.

4. A toboggan as claimed in claim 3 wherein each of the guide ribs extends rearwardly from its forward curved portion along each side of the bottom gliding surface.

5. A toboggan as claimed in claim 4 further including a pair of exterior sidewalls, each exterior sidewall extending upwardly from the bottom surface of a respective runner arm member and rearwardly therefrom along an outside edge of each of the guide ribs.

6. A toboggan as claimed in claim 3 wherein the rear portion, the runner arm members and the guide ribs are integrally formed.

7. A steerable sledding apparatus for sledding on snow comprising, seating means for supporting a user's buttocks thereon, the seating means having a generally flat bottom gliding surface for slidably engaging and transmitting said user's weight to said snow, a leading surface curving forwardly and upwardly from the seating means to assist in guiding the gliding surface on top of the snow, first and second spaced guide rib means for adjusting directional movement of the apparatus, each of first and second guide rib means extending forwardly and beyond the seating means and having a forward curved portion which curves away from the gliding surface upwardly and in an inward direction towards the opposing one of the first and second guide rib means, the forward curved portion of each of the first and second guide rib means being vertically movable relative to the other of the guide rib means between a raised position wherein said forward portion is spaced substantially above the snow and a lowered position wherein the forward curved portion is brought into engagement with the snow.

8. A sledding apparatus as claimed in claim 7 wherein said leading surface extends forwardly from the gliding surface along an inward edge portion of each of the first and second guide rib means to assist in guiding the first and second guide rib means on top of the snow.

9. A sledding apparatus as claimed in claim 7 wherein the forward curved portion of each of the first and second guide rib means is biased to resiliently return to the raised position, the first and second guide rib means each further including a rearward portion extending rearwardly from a respective forward curved portion with the seating means disposed between the rearward portions, each rearward portion projecting downwardly beneath the gliding surface a distance selected so as not to substantially interfere with sliding of the gliding surface on the snow.

10. A sledding apparatus as claimed in claim 7 further including exterior sidewall means extending upwardly along an outer edge portion of each of said first and second guide rib means.

11. The sledding apparatus as claimed in claim 7 wherein the seating means merges forwardly into a bifurcated forward steering portion, the forward steering portion including right and left runner arm members having bottom surfaces which curve upwardly from the gliding surface, the forward curved portion of the first and second guide rib means extending along a lowermost bottom surface of a respective right and left runner arm member.

12. The sledding apparatus as claimed in claim 11 wherein the leading surface extends along an inward edge portion of each of the first and second runner arms in a generally forwardly open V-shape.

13. The sledding apparatus as claimed in claim 10 wherein said sidewall means, said seating means, said leading surface and said first and second guide rib means are integrally formed.

14. A steerable apparatus for sledding on snow comprising, spaced apart first and second guide rib means for adjusting directional movement of the apparatus, each of the first and second guide rib means having a forward portion and a rearward portion, support means for supporting a user thereon, the support means located between the rearward portions of said first and second guide rib means and including a generally flat snow engaging bottom gliding surface to transmit load forces to said snow between said first and second guide rib means, the support means having a front end and a rear end, snow deflecting lead surface means curving upwardly away from the front end to assist in directing said gliding surface on top of said snow, the rearward portion of each of said guide rib means projecting downwardly past said gliding surface a distance selected so as not to substantially interfere with the sliding of said gliding surface on said snow, the forward portion of each of said first and second guide rib means extending forwardly beyond the front end, and including a forward curved portion curving away from the gliding surface upwardly and in an inward direction towards the other one of said guide rib means, the forward curved portion of each of the first and second guide rib means being resiliently movable relative to the other from an unbiased raised position substantially spaced above said snow, to a biased lowered position wherein the forward curved portion is moved into engagement with said snow.

15. An apparatus as claimed in claim 14 wherein said support means comprises a semi-flexible member spanning between the first and second guide rib means and wherein twisting of the support means permits relative vertical movement of the forward curved portions of said first and second guide rib means.

16. An apparatus as claimed in claim 15 wherein the rearward portions of said first and second guide rib means taper inwardly towards the rear end portion of the sliding surface.

17. An apparatus as claimed in claim 14 wherein a forwardmost end of each forward curved portion is resiliently movable inwardly from the unbiased raised position to a biased inward position spaced towards the other of the guide rib means.

18. An apparatus as claimed in claim 14 wherein said gliding surface comprises a generally flat surface extending from the rearward portion of said first guide rib means to the rearward portion of said second guide rib means to distribute a user's weight substantially evenly between said rearward portions, the gliding surface merging forwardly into a bifurcated forward steering portion, the forward steering portion including right and left runner arm members having bottom surfaces which curve upwardly from the gliding surface, the forward curved portion of the first and second guide rib means extending along a lowermost bottom surface of a respective right and left runner arm member.

19. An apparatus as claimed in claim 18 wherein said lead surface means, said support means and said first and second guide rib means are integrally formed.

20. An apparatus as claimed in claim 19 further including braking means for engaging said snow to effect braking of movement of the apparatus.

* * * * *